United States Patent
Levy et al.

(10) Patent No.: US 11,570,118 B2
(45) Date of Patent: *Jan. 31, 2023

(54) NETWORK TRAFFIC DISRUPTIONS

(71) Applicant: MELLANOX TECHNOLOGIES, LTD., Yokneam (IL)

(72) Inventors: Moni Levy, Petach Tikva (IL); Sagi Rotem, Adi (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 118 days.

This patent is subject to a terminal disclaimer.

(21) Appl. No.: 17/015,123

(22) Filed: Sep. 9, 2020

(65) Prior Publication Data

US 2020/0403927 A1 Dec. 24, 2020

Related U.S. Application Data

(63) Continuation of application No. 16/255,863, filed on Jan. 24, 2019, now Pat. No. 10,834,006.

(51) Int. Cl.
| | |
|---|---|
| *H04L 47/32* | (2022.01) |
| *H04L 43/04* | (2022.01) |
| *H04L 49/20* | (2022.01) |
| *H04L 47/2475* | (2022.01) |
| *H04L 47/62* | (2022.01) |

(52) U.S. Cl.
CPC ............ *H04L 47/32* (2013.01); *H04L 43/04* (2013.01); *H04L 47/2475* (2013.01); *H04L 47/62* (2013.01); *H04L 49/208* (2013.01)

(58) Field of Classification Search
None
See application file for complete search history.

(56) References Cited

U.S. PATENT DOCUMENTS

| | | | |
|---|---|---|---|
| 5,347,637 | A | 9/1994 | Halford |
| 6,041,058 | A | 3/2000 | Flanders et al. |
| 8,095,683 | B2 | 1/2012 | Balasubramaniam Chandra |
| 8,208,380 | B1 | 6/2012 | Nachum et al. |
| 10,033,607 | B2 | 7/2018 | Badea et al. |
| 10,230,810 | B1 | 3/2019 | Bhide et al. |
| 10,277,518 | B1 | 4/2019 | Matthews et al. |
| 10,834,006 | B2 | 11/2020 | Levy et al. |
| 2001/0055274 | A1 | 12/2001 | Hegge et al. |

(Continued)

FOREIGN PATENT DOCUMENTS

CN 1529256 A 9/2004

OTHER PUBLICATIONS

U.S. Appl. No. 16/416,290 office action dated Dec. 9, 2020.
(Continued)

*Primary Examiner* — Marcus Smith
(74) *Attorney, Agent, or Firm* — Kligler & Associates Patent Attorneys Ltd

(57) ABSTRACT

Apparatus including a network switch which includes switching circuitry to switch packets, packet drop decision circuitry to identify a packet that is to be dropped, packet duplication circuitry to duplicate the packet that is to be dropped, producing a first packet and a second packet, and packet exporting circuitry to export the first packet to a memory external to the switch via direct memory access (DMA). Related apparatus and methods are also provided.

18 Claims, 3 Drawing Sheets

(56) References Cited

U.S. PATENT DOCUMENTS

| | | |
|---|---|---|
| 2004/0003094 A1 | 1/2004 | See |
| 2006/0265561 A1 | 11/2006 | Boyd et al. |
| 2007/0223385 A1 | 9/2007 | Berly et al. |
| 2008/0279102 A1 | 11/2008 | Sankaran et al. |
| 2013/0258858 A1 | 10/2013 | Cherian et al. |
| 2014/0078915 A1 | 3/2014 | Edsall et al. |
| 2014/0089450 A1 | 3/2014 | Raindel et al. |
| 2014/0223111 A1 | 8/2014 | Dinkjian et al. |
| 2014/0286352 A1* | 9/2014 | Turgeman ............... H04L 45/00 370/428 |
| 2014/0344536 A1 | 11/2014 | Benisty et al. |
| 2015/0134875 A1 | 5/2015 | Veal |
| 2015/0254104 A1 | 9/2015 | Kessler et al. |
| 2016/0087916 A1 | 3/2016 | Janardhanan |
| 2017/0104642 A1 | 4/2017 | Miura et al. |
| 2017/0279817 A1 | 9/2017 | Campbell et al. |
| 2017/0337010 A1 | 11/2017 | Kriss et al. |
| 2017/0339074 A1 | 11/2017 | Melman et al. |
| 2018/0123933 A1 | 5/2018 | Yamashima et al. |
| 2018/0183733 A1 | 6/2018 | Dcruz et al. |
| 2019/0327190 A1* | 10/2019 | Browne ............. H04L 49/3063 |
| 2019/0334799 A1* | 10/2019 | Iizuka ................ H04L 43/0852 |
| 2020/0106740 A1* | 4/2020 | Bangalore Krishnamurthy .......... H04L 43/12 |
| 2020/0287967 A1 | 9/2020 | Gafni et al. |
| 2020/0371708 A1 | 11/2020 | Karmani et al. |

OTHER PUBLICATIONS

U.S. Appl. No. 16/416,290 Office Action dated May 20, 2021.
Wikipedia, "Direct Memory Access," pp. 1-7, last edited Nov. 4, 2018.
U.S. Appl. No. 16/416,290 Office Action dated Jan. 24, 2022.

* cited by examiner

NETWORK TRAFFIC DISRUPTIONS

CONTINUITY INFORMATION

The present application is a Continuation of U.S. patent application Ser. No. 16/255,863 of Levy et al, filed 24 Jan. 2019.

FIELD OF THE INVENTION

The present invention relates to systems for diagnosing network traffic disruptions.

BACKGROUND OF THE INVENTION

It is known to diagnose network traffic disruptions. The inventors of the present invention believe that existing systems for diagnosing network traffic disruptions tend to use one or more of a limited number of techniques.

SUMMARY OF THE INVENTION

The present invention, in certain embodiments thereof, seeks to provide an improved system and method for diagnosing network traffic disruptions. In certain exemplary embodiments of the present invention, the system and method relate to identification and/or quantification and/or analyzing of network traffic disruptions and/or anomalies.

There is thus provided in accordance with an exemplary embodiment of the present invention a method including providing a network switch, including switching circuitry, packet drop decision circuitry, packet duplication circuitry, and packet exporting circuitry, and performing the following in the network switch: switching packets in the switching circuitry, identifying a packet that is to be dropped in the packet drop decision circuitry, duplicating the packet that is to be dropped in the packet duplication circuitry, producing a first packet and a second packet, exporting the first packet to a tail-drop packet buffer in the packet exporting circuitry, and exporting the second packet to a cyclic packet buffer in the packet exporting circuitry.

Further in accordance with an exemplary embodiment of the present invention the exporting the first packet and the exporting the second packet also include exporting a time stamp associated with the packet that is to be dropped.

Still further in accordance with an exemplary embodiment of the present invention the exporting the first packet and the exporting the second packet also include exporting a drop reason associated with the packet that is to be dropped.

Additionally in accordance with an exemplary embodiment of the present invention the method also includes analyzing at least one of the tail-drop packet buffer and the cyclic packet buffer and producing a result.

Moreover in accordance with an exemplary embodiment of the present invention the method also includes analyzing both the tail-drop packet buffer and the cyclic packet buffer and producing a result.

Further in accordance with an exemplary embodiment of the present invention the result includes a begin time of a network disruption and an end time of the network disruption.

Still further in accordance with an exemplary embodiment of the present invention the method also includes, subsequent to analyzing the tail-drop packet buffer, clearing the tail-drop packet buffer.

Additionally in accordance with an exemplary embodiment of the present invention the method also includes using the result to provide a reason for packet dropping.

Moreover in accordance with an exemplary embodiment of the present invention the analyzing includes analyzing packet data.

Further in accordance with an exemplary embodiment of the present invention the analyzing packet data includes associating the packet with at least one flow and/or at least one application.

There is also provided in accordance with another exemplary embodiment of the present invention apparatus including a network switch including: switching circuitry configured for switching packets, packet drop decision circuitry configured for identifying a packet that is to be dropped, packet duplication circuitry configured for duplicating the packet that is to be dropped, producing a first packet and a second packet, and packet exporting circuitry configured for exporting the first packet to a tail-drop packet buffer and for exporting the second packet to a cyclic packet buffer.

Further in accordance with an exemplary embodiment of the present invention the exporting the first packet and the exporting the second packet also include exporting a time stamp associated with the packet that is to be dropped.

Still further in accordance with an exemplary embodiment of the present invention the exporting the first packet and the exporting the second packet also include exporting a drop reason associated with the packet that is to be dropped.

Additionally in accordance with an exemplary embodiment of the present invention the apparatus also includes analysis circuitry configured for analyzing at least one of the tail-drop packet buffer and the cyclic packet buffer and producing a result.

Moreover in accordance with an exemplary embodiment of the present invention the analysis circuitry is configured for analyzing both the tail-drop packet buffer and the cyclic packet buffer and producing a result.

Further in accordance with an exemplary embodiment of the present invention the result includes a begin time of a network disruption and an end time of the network disruption.

Still further in accordance with an exemplary embodiment of the present invention the analysis circuitry is also configured for, subsequent to analyzing the tail-drop packet buffer, clearing the tail-drop packet buffer.

Additionally in accordance with an exemplary embodiment of the present invention the analysis circuitry is also configured for using the result to provide a reason for packet dropping.

Moreover in accordance with an exemplary embodiment of the present invention the analyzing includes analyzing packet data.

Further in accordance with an exemplary embodiment of the present invention the analyzing packet data includes associating the packet with at least one flow and/or at least one application.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

By way of introduction, it is known to diagnose network traffic disruptions. The inventors of the present invention believe that existing systems for diagnosing network traffic disruptions tend to use one or more of the following techniques:

Counters which count, for example, the number of packets of different types which are dropped, or which count a total number of packets which is dropped;

Flags/sticky bits which indicate, at any given time, one or more reasons for drop decisions which are active at that time;

Capturing/mirroring all or essentially all network traffic for analysis; and

Statistical sampling of network traffic, for analysis of the statistical sample.

In exemplary embodiments of the present invention, as described below, analysis of network traffic disruptions is enabled both "online"—during running of the network—and later, after running of the network (or at least after network disruption/s have completed.

Figure 1:
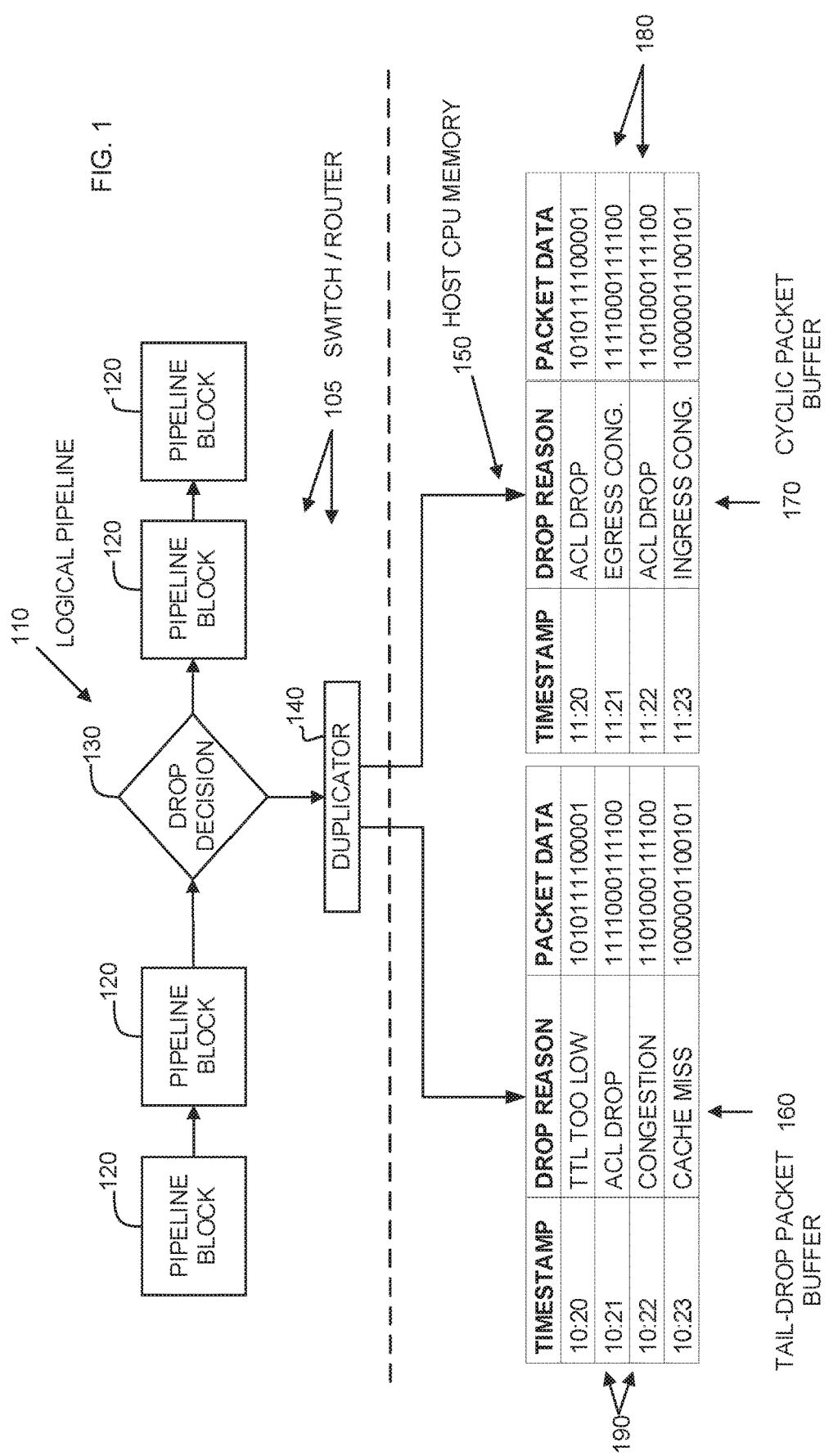
FIG. 1 is a simplified pictorial block diagram illustration of a system for diagnosing network traffic disruptions, constructed and operative in accordance with an exemplary embodiment of the present invention.

Reference is now made to FIG. 1, which is a simplified pictorial block diagram illustration of a system for diagnosing network traffic disruptions, constructed and operative in accordance with an exemplary embodiment of the present invention.

The system of FIG. 1 comprises a switch/router 105, which may be a switch, a router, or a combined switch/router. The switch/router 105 comprises a plurality of pipeline blocks 120 which, as is known in the art, perform cooperatively to switch and/or route incoming packets (not shown) to their destination.

By way of non-limiting example, the switch 105 may be implemented as: "pure" hardware; an Application Specific Integrated Circuit (ASIC); a multi-core Networking Processing Unit (NPU, one suitable non-limiting example of which may be the EzChip NPS-400, commercially available from Mellanox Technologies Ltd.); a Field Programmable Gate Array (FPGA); or a SW component, provided that the SW component is capable of handling packets at full packet input speed, also known in the art as "line rate".

The system of FIG. 1 also comprises a drop decision block 130, which is operatively associated with the plurality of pipeline blocks 120 and which is configured to determine whether a given packet being processed by the plurality of pipeline blocks 120 is to be dropped rather than being successfully switched/routed to its destination by the system of FIG. 1.

A non-limiting list of exemplary reasons that a given packet might be dropped includes the following:

Link error; a packet is dropped due to link level error for example frame check sequence (FCS) error;

Packet buffer overflow error; a packet is dropped due to inadequate packet buffer space; VLAN filter; a packet is filtered out in accordance with a VLAN filter;

Spanning tree; a loop has been detected in accordance with a spanning tree algorithm, so that the given packet should not be forwarded (although it is appreciated that such packets might be separately analyzed and correlated with system flows to better understand network traffic disruptions);

TTL (time to live) too low; and

ACL—ACL reason drop; a packet is dropped due to a limitation in an appropriate Access Control List; and As stated above, the list of exemplary reasons is non-limiting; persons skilled in the art will appreciate that many other reasons for dropping a given packet might be possible.

If a given packet is determined to be dropped, the given packet is passed to a duplicator 140, which is configurated to duplicate the given packet and to export one copy thereof to a tail-drop packet buffer 160 and one copy thereof to a circular buffer 170.

In exemplary embodiments of the present invention, the tail-drop packet buffer 160 and the circular packet buffer 170 are comprised in a host CPU (host processor) memory 150, which is disposed in a host processor and is operatively associated with the switch 105. In some exemplary embodiments, the switch 105 has direct memory access (DMA) to the host processor memory 150.

As packets are inserted (in exemplary embodiments at line rate, as defined above) into the tail-drop packet buffer 160, once the tail-drop packet buffer 160 becomes full, further packets are discarded (not inserted into the tail-drop packet buffer 160). By contrast, as packets are inserted into the circular packet buffer 170, the circular packet buffer 170 is managed as a circular buffer so that (if, for example, the circular packet buffer 170 has room for n packets), at any given time the last n packets entered into the circular packet buffer 170 are stored therein, with new packets overwriting old packets.

The operation of the exemplary system of FIG. 1 is now further described.

Persons skilled in the art will appreciate that many types of traffic may be handled by a switch, such as the switch 105 of FIG. 1. There may be a plurality or multiplicity of reasons (such as, by way of non-limiting example, the exemplary reasons for dropping a packet described above) because of which a packet (also known as a data frame) may be dropped (not delivered).

As depicted in FIG. 1 and as described above, when a given packet is determined to be dropped, the given packet is passed to the duplicator 140, which is configurated to duplicate the given packet and to export one copy thereof to the tail-drop packet buffer 160 and one copy thereof to the circular buffer 170. In exemplary embodiments of the present invention, the tail-drop packet buffer 160 and the circular packet buffer 170 are comprised in the host CPU (host processor) memory 150, which is disposed in a host processor and is operatively associated with the switch 105. In some exemplary embodiments, the switch 105 has direct memory access (DMA) to the host processor memory 150.

In exemplary embodiments, each packet 190 delivered to the tail-drop packet buffer 160 includes a timestamp, a drop reason, and actual data comprised in each said packet 190. Similarly, each packet 180 delivered to the circular buffer 170 includes a timestamp, a drop reason, and actual data comprised in each said packet 180.

When a packet is received in the tail-drop packet buffer 160 and/or the circular packet buffer 170, a CPU event may be created (soon or immediately); this allows both automated analysis and quick notification of a system user/administrator who might wish to take immediate action.

In the host processor 150, any appropriate analysis may thus take place on the packets 180 and on the packets 190 to determine characteristics of the dropped packets. Such analysis may include, by way of non-limiting example, any one or more of: start time of dropping of packets; end time of dropping of packets; one or more reasons for dropping of packets; any possible commonality between the actual data comprised in packets. Because the packet data (in exemplary embodiments, all packet data) is included in the packets 180 and in the packets 190, the analysis may include mapping to particular flows/applications and may include deterministic understanding of the types of traffic/transaction/operation which was negatively affected by packet drop. Output of the analysis may be used, either in an automated way or by a user/system administrator, to modify network configuration, hardware configuration, hardware components, or any other applicable parameters/components in order to address (and hopefully to resolve) the root cause/s of the analyzed problem.

Without limiting the generality of the foregoing, it is particularly appreciated that because both the tail-drop packet buffer 160 which holds information on the first packets dropped and the cyclic packet buffer 170 which holds information on the most recent packets dropped are maintained, it is possible inter alia to determine a begin time and an end time of a network traffic disruption by examining both packets in the tail-drop packet buffer 160 and packets in the cyclic packet buffer 170. Thus, a helpful synergy is achieved by providing both the tail-drop packet buffer 160 and the cyclic packet buffer 170.

Figure 2:
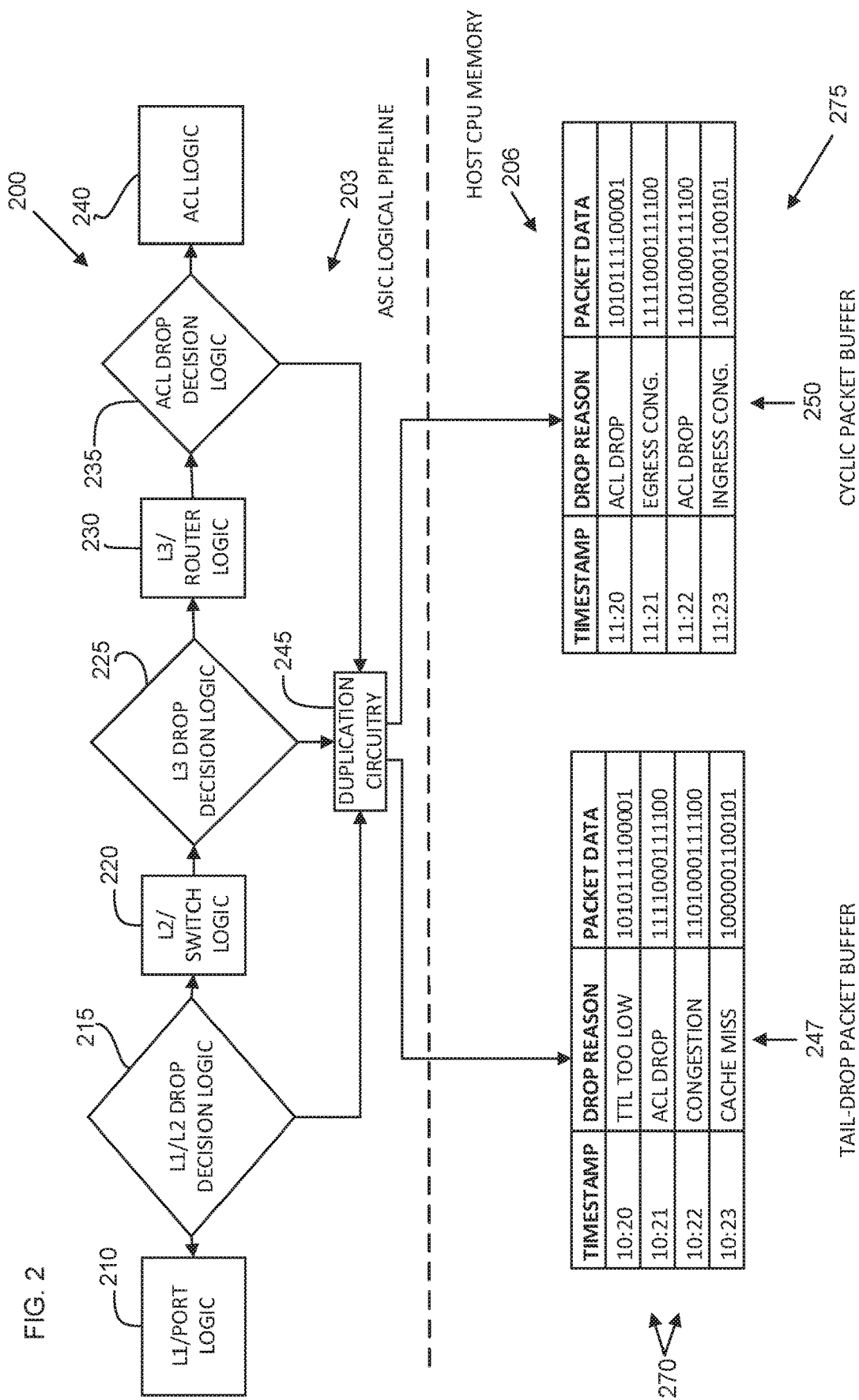
FIG. 2 is a simplified pictorial block diagram illustration of an exemplary embodiment of the system of FIG. 1.

Reference is now additionally made to FIG. 2, which is a simplified pictorial block diagram illustration of an exemplary embodiment of the system of FIG. 1.

In particular, the exemplary embodiment of FIG. 2 shows particular circuitry which could comprise a non-limiting exemplary embodiment of the system of FIG. 1. The exemplary embodiment of FIG. 2 is provided in order to describe a particular possible example of such circuitry; it is appreciated that other examples are contemplated as part of exemplary embodiments of the present invention.

FIG. 2 depicts a switch/router, generally designated 200. Circuitry comprised in the switch/router 200, termed an "ASIC logical pipeline", is generally designated 203. While the particular example of an application specific integrated circuit (ASIC) is used, persons skilled in the art will appreciate that other embodiments are possible, as described above with reference to FIG. 1.

In FIG. 2, logic circuitry which makes packet drop decisions is depicted. In particular, the following such logic circuitry is depicted: L1/L2 drop decision logic circuitry 215; L3 decision drop logic circuitry 225; and ACL drop decision logic circuitry 235. Persons skilled in the art will appreciated that elements 215, 225, and 235 are exemplary, and that additional (or different) circuitry to make packet drop decisions may be included in the apparatus of FIG. 2.

The apparatus of FIG. 2 also includes logic circuitry which makes packet switching/routing decisions. In particular, the following such logic circuitry is depicted in FIG. 2: L1/port logic circuitry 210; L2/switch logic circuitry 220; L3/router logic circuitry 230; and ACL logic circuitry 240. Persons skilled in the art will appreciate that each of the exemplary types of logic circuitry 210, 220, 230, and 240 is configured to carry out conventional switching/routing tasks that are well known in the art.

In each case of the logic circuitry which makes packet drop decisions (L1/L2 drop decision logic circuitry 215; L3 decision drop logic circuitry 225; and ACL drop decision logic circuitry 235), if a decision is made by the circuitry that a particular packet should be dropped (as described in detail above with reference to FIG. 1), then the packet is passed to duplication circuitry 245. Otherwise, the packet is passed to the appropriate circuitry which makes packet switching routing decisions (L1/port logic circuitry 210; L2/switch logic circuitry 220; L3/router logic circuitry 230; and ACL logic circuitry 240).

The duplication circuitry 245 is operative to duplicate a received packet. The duplication may be carried out by any appropriate mechanism. For example, and without limiting the generality of the foregoing, the duplication circuitry 245 may comprise a packet buffer (not shown), and may be operative to output a packet stored in the packet buffer twice, thus duplicating the packet which is stored in the packet buffer.

As described above in more detail with reference to FIG. 1, one copy of each dropped packet is output from the duplication circuitry 245 to a tail-drop packet buffer 247, and one copy is output to a cyclic packet buffer 250, each of which are stored in a memory 206 of a host CPU which is operatively associated with the switch/router 200. The outputting described may be performed by packet export circuitry (not shown), which is typically comprised in or associated with the duplication circuitry 245. As described above with reference to FIG. 2, the packets can be provided to the respective buffers 247, 250 via direct memory access; export circuitry (not shown) to provide direct memory access between the switch/router 200 and the memory 206 of the host CPU is well-known in the art.

Similarly to the description of FIG. 1, in the system of FIG. 2 the tail-drop packet buffer 247 comprises a plurality of packet entries 270, while the cyclic packet buffer 250 comprises a plurality of packet entries 275. Again, similarly to the description of FIG. 2, each of the packet entries 270, 275 may comprise a timestamp, a drop reason, and actual data comprised in each said packet.

Other aspects of the system of FIG. 2 are similar to the system of FIG. 1 as described above, mutatis mutandis.

Figure 3:
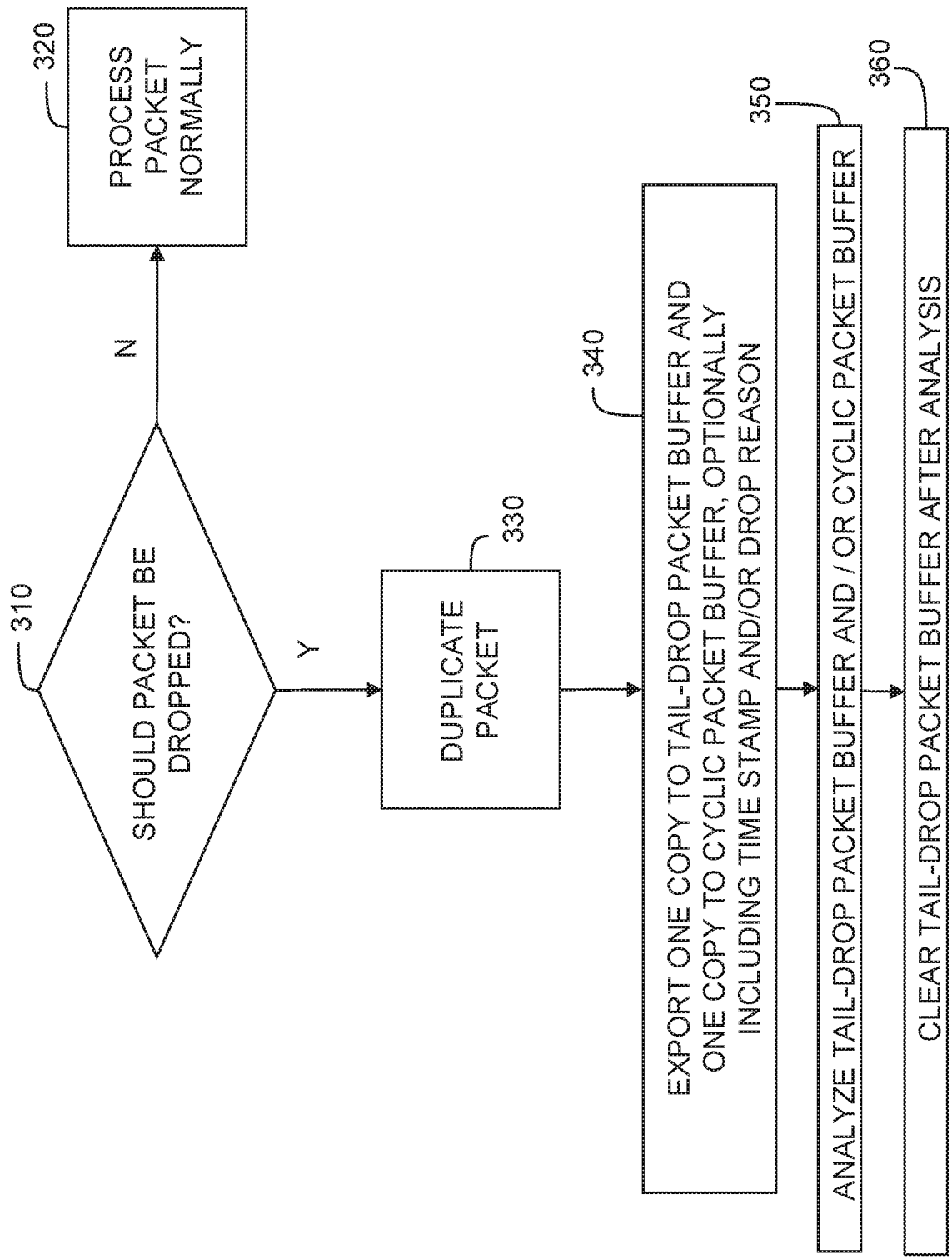
FIG. 3 is a simplified flowchart illustration of an exemplary method of operation of the system of FIGS. 1 and 2.

Reference is now additionally made to FIG. 3, which is a simplified flowchart illustration of an exemplary method of operation of the system of FIGS. 1 and 2. The method of FIG. 3 may include the following steps:

A decision is made as to whether a packet is to be dropped (step 310). If the packet is not to be dropped, packet processing proceeds normally (step 320). Referring specifically to the exemplary embodiment of FIG. 2, elements 215, 225, and 235 make the decision of step 310.

If the packet is to be dropped, the packet is duplicated (step 330). Referring specifically to the exemplary embodiment of FIG. 2, element 245 performs the duplication.

Then one copy of the duplicated packet is exported to a tail-drop packet buffer and one copy is exported to a cyclic packet buffer (step 340). Optionally, the exported packets include (in addition to actual packet contents) a time stamp and/or a drop reason. The export is performed by export circuitry, as described above with reference to FIG. 2.

In step 350, the packets in the tail-drop packet buffer and/or the packets in the cyclic packet buffer are analyzed. Subsequent to analysis, packets in the tail-drop packet buffer are cleared out, so that there will be room to hold packets in a possible subsequent instance of packet drop. Step 350 generally takes place in the host CPU in which the memory 206 is comprised.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

In the claims which follow, the term "switch", in its various grammatical forms includes switch and/or router (switching and/or routing, etc.).

It will be appreciated by persons skilled in the art that the present invention is not limited by what has been particularly shown and described hereinabove. Rather the scope of the invention is defined by the appended claims and equivalents thereof:

The invention claimed is:

1. Apparatus comprising:
    a network switch comprising:
        switching circuitry to switch packets;
        packet drop decision circuitry to identify a packet that is to be dropped;
        packet duplication circuitry to duplicate the packet that is to be dropped, producing a first packet and a second packet; and
        packet exporting circuitry to: 1) export the first packet to a tail-drop packet buffer in a memory, the memory external to the network switch, via direct memory access (DMA); and, 2) export the second packet to a cyclic packet buffer in the memory.

2. Apparatus according to claim 1 and wherein the packet duplication circuitry adds metadata to one or both of: the first packet and the second packet.

3. Apparatus according to claim 2 and wherein the metadata comprises one or both of the following: a timestamp; and a drop reason.

4. Apparatus according to claim 3 further comprising analysis circuitry to analyze both the tail-drop packet buffer and the cyclic packet buffer, and to produce a result.

5. Apparatus according to claim 4 and wherein the result comprises a begin time of a network disruption and an end time of the network disruption.

6. Apparatus according to claim 4 and wherein the analysis circuitry, subsequent to analyzing the tail-drop packet buffer, clears the tail-drop packet buffer.

7. Apparatus according to claim 4 and wherein the analysis circuitry uses the result to provide a reason for packet dropping.

8. Apparatus according to claim 4 and wherein the analysis circuitry analyzes packet data, including associating said packet that is to be dropped with at least one flow and/or at least one application.

9. Apparatus comprising:
    a network switch comprising:
        switching circuitry to switch packets;
        packet drop decision circuitry to identify a packet that is to be dropped; and
        packet duplication circuitry to:
            duplicate the packet that is to be dropped, producing a first packet and a second packet;
            add metadata to one or both of: the first packet; and the second packet;
        export the first packet to a tail drop buffer in a memory external to the switch;
        export the second packet to a cyclic packet buffer in the memory; and
        wherein the metadata of the exported first packet and the metadata of the exported second packet allow for a beginning time and an end time to be determined for a disruption of the network.

10. Apparatus according to claim 9, wherein the metadata comprises one or both of the following: a timestamp; and a drop reason.

11. Apparatus according to claim 10, wherein the network switch is in communication with the memory, the memory comprising:
    the tail-drop packet buffer; and
    the cyclic packet buffer.

12. Apparatus according to claim 11 further comprising analysis circuitry to analyze both the tail-drop packet buffer and the cyclic packet buffer, and to produce a result.

13. Apparatus according to claim 12 and wherein the result comprises a begin time of a network disruption and an end time of the network disruption.

14. Apparatus according to claim 12 and wherein the analysis circuitry, subsequent to analyzing the tail-drop packet buffer, clears the tail-drop packet buffer.

15. Apparatus according to claim 12 and wherein the analysis circuitry uses the result to provide a reason for packet dropping.

16. Apparatus according to claim 12 and wherein the analysis circuitry analyzes packet data, including associating said packet that is to be dropped with at least one flow and/or at least one application.

17. A method comprising:
    performing the following in a network switch comprising switching circuitry, packet drop decision circuitry, and packet duplication circuitry:
        switching packets in the switching circuitry;
        identifying a packet that is to be dropped in the packet drop decision circuitry; and
        in the packet duplication circuitry:
            duplicating the packet that is to be dropped, producing a first packet and a second packet;
            adding metadata to one or both of: the first packet; and the second packet;
            exporting the first packet to a tail drop buffer in a memory external to the switch;
            exporting the second packet to a cyclic packet buffer in the memory; and
            determining a beginning time and an end time for a disruption of the network based on the metadata of the exported first packet and the metadata of the exported second packet.

18. A method comprising:
    performing the following in a network switch comprising switching circuitry, packet drop decision circuitry, packet duplication circuitry, and packet exporting circuitry:
        switching packets in the switching circuitry;
        identifying a packet that is to be dropped in the packet drop decision circuitry;
        duplicating the packet that is to be dropped in the packet duplication circuitry, producing a first packet and a second packet;
        exporting the first packet, using the packet exporting circuitry, to a tail drop buffer in a memory external to the network switch, via direct memory access (DMA); and exporting the second packet, using the packet exporting circuitry, to a cyclic packet buffer in the memory.

* * * * *